Sept. 29, 1925.　　　　　　　　　　　　　　　1,555,189
E. CRAIG
METHOD AND APPARATUS FOR MAKING WIREBOUND BOXES
Filed April 2, 1923　　　12 Sheets-Sheet 2
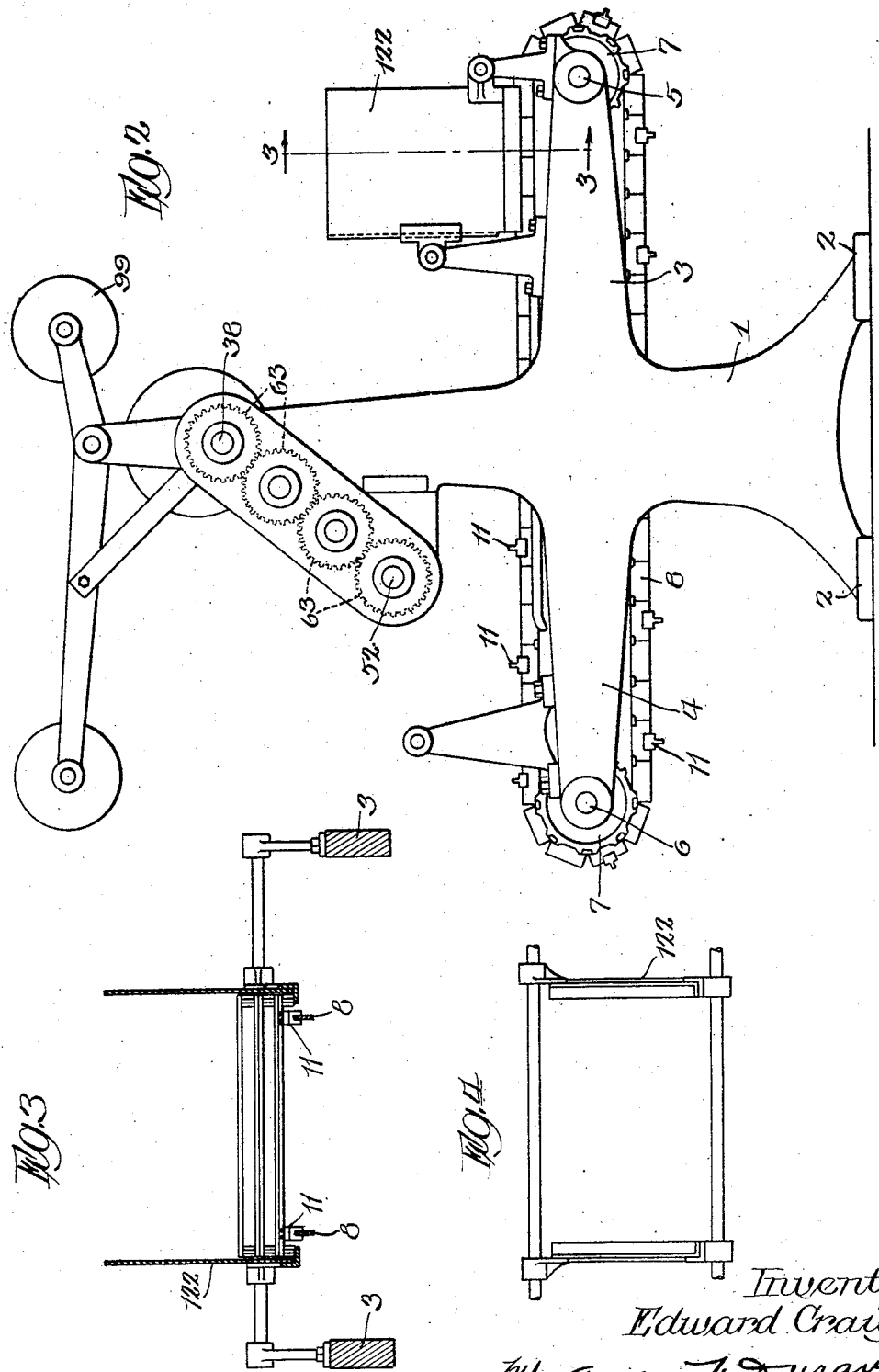
Inventor:
Edward Craig
by Arthur F. Durand
Atty.

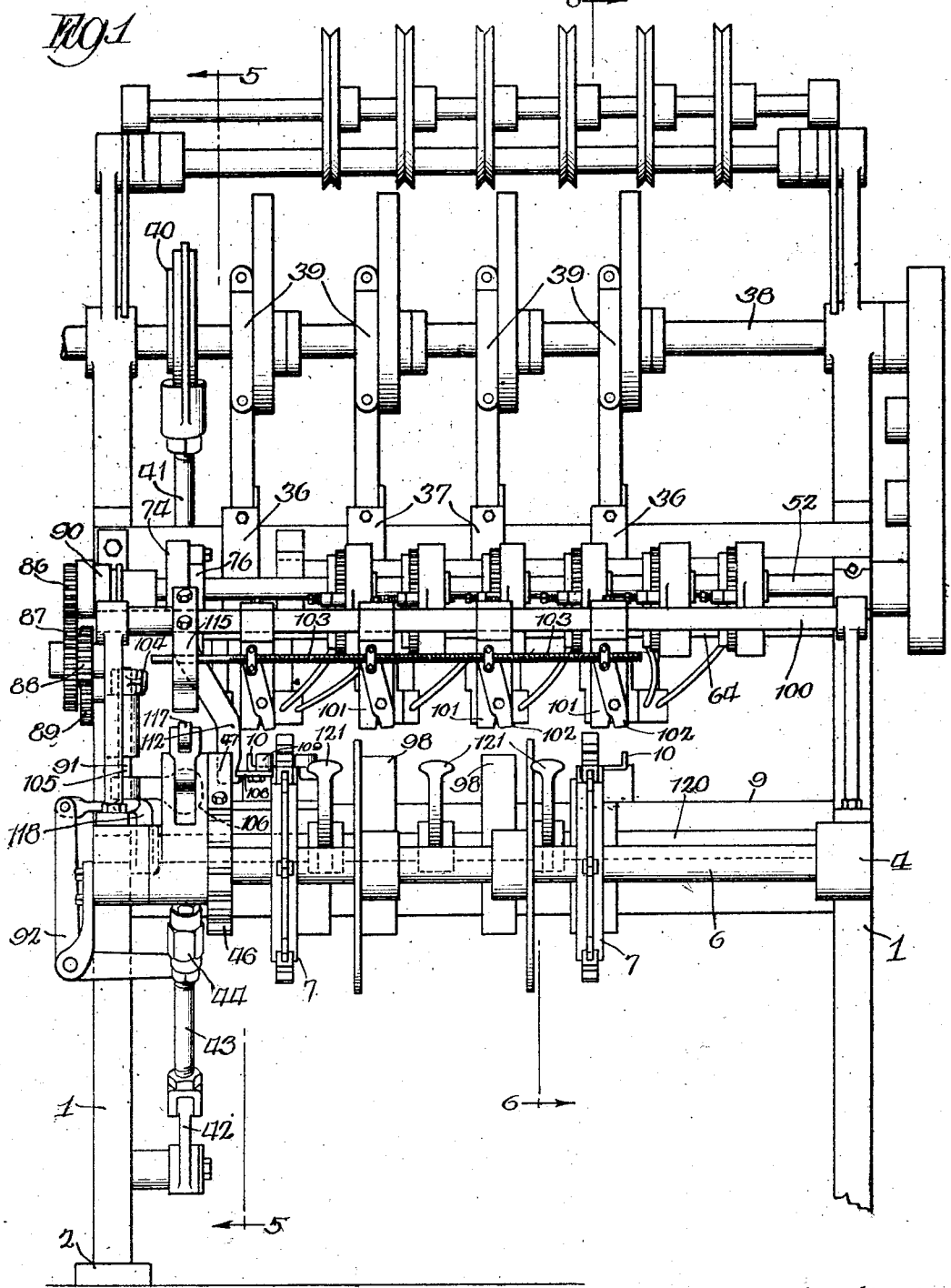

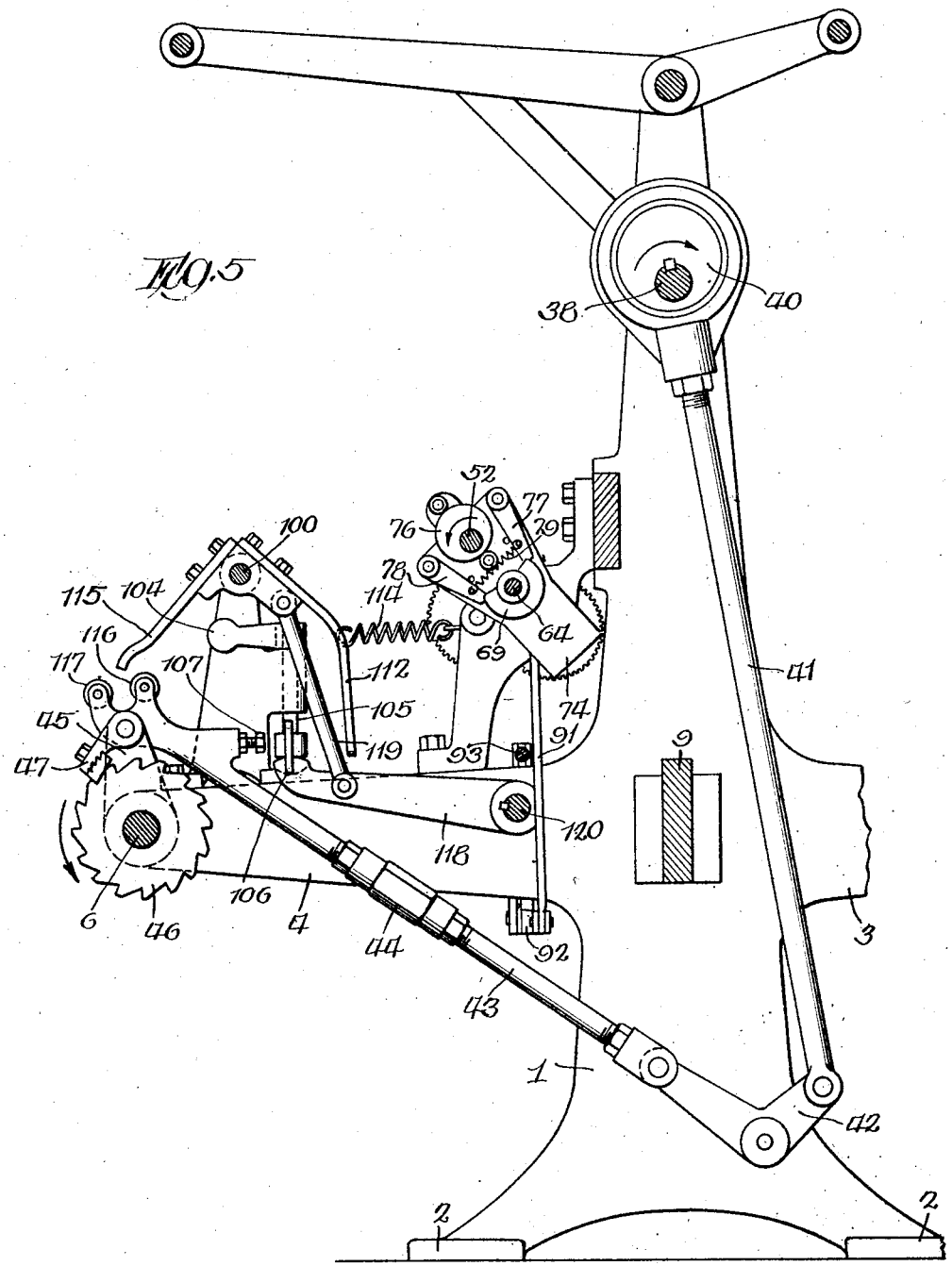

Sept. 29, 1925.  
E. CRAIG  
1,555,189  
METHOD AND APPARATUS FOR MAKING WIREBOUND BOXES  
Filed April 2, 1923  12 Sheets-Sheet 4
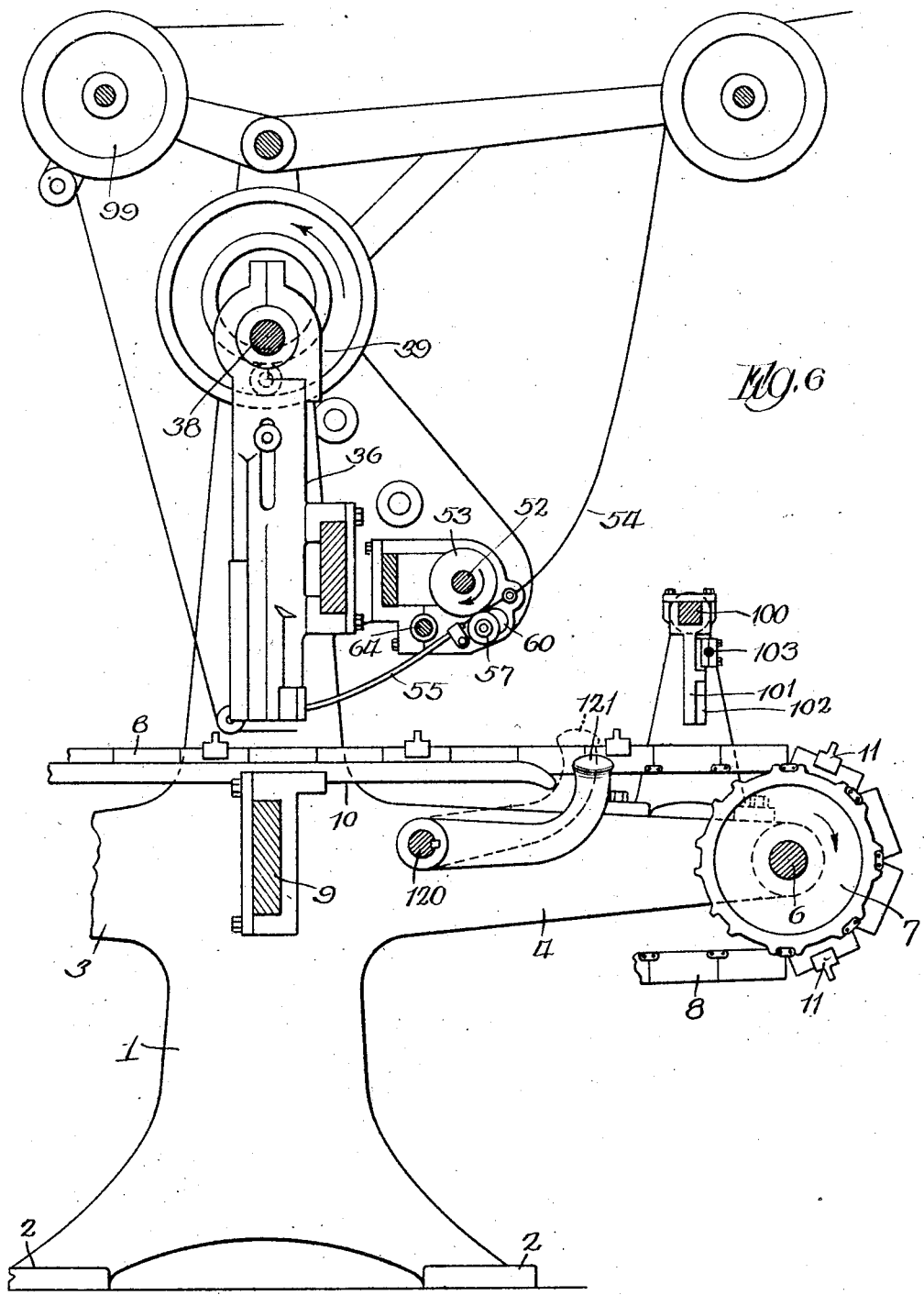
Inventor:  
Edward Craig  
by Arthur H. Durand  
Atty

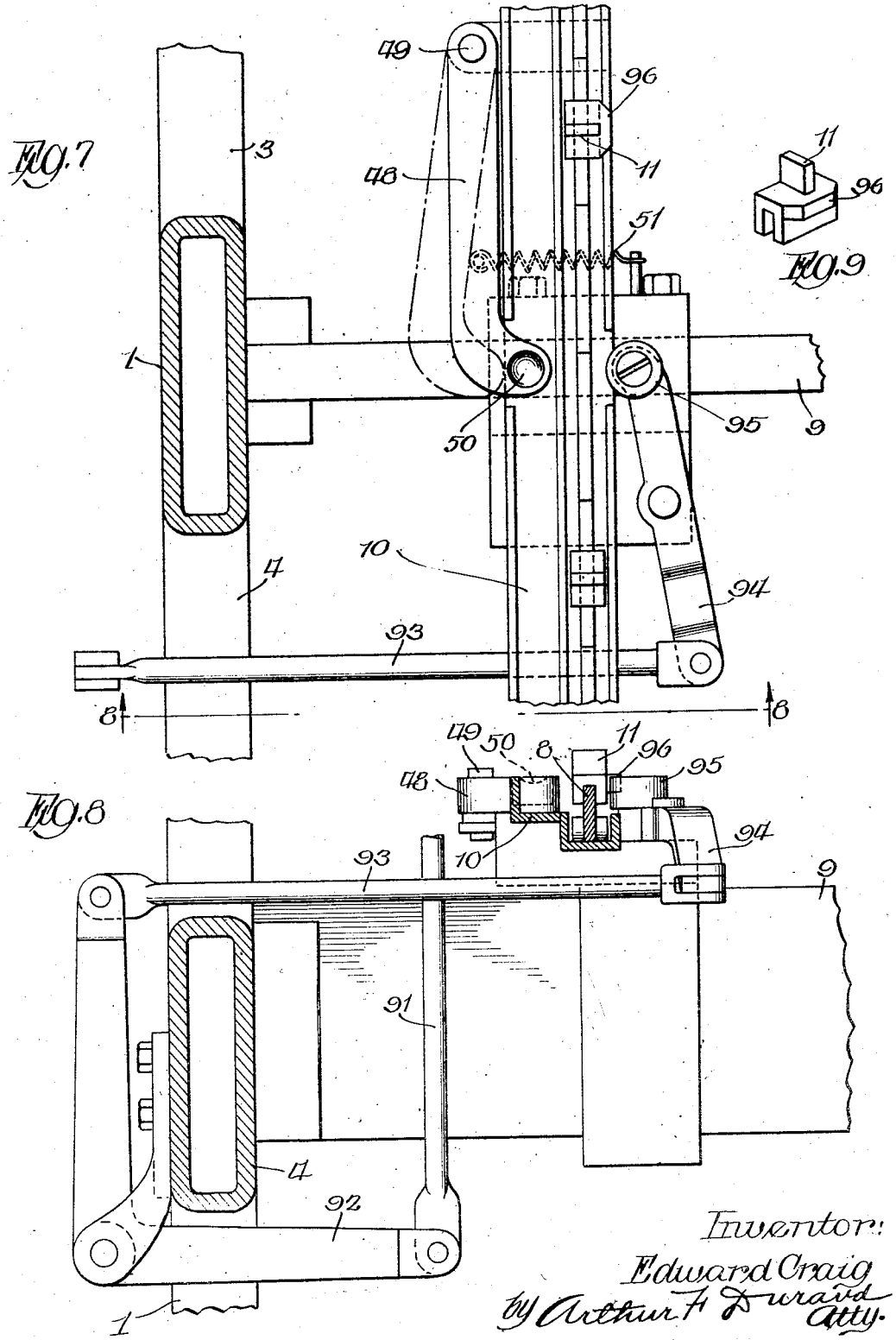

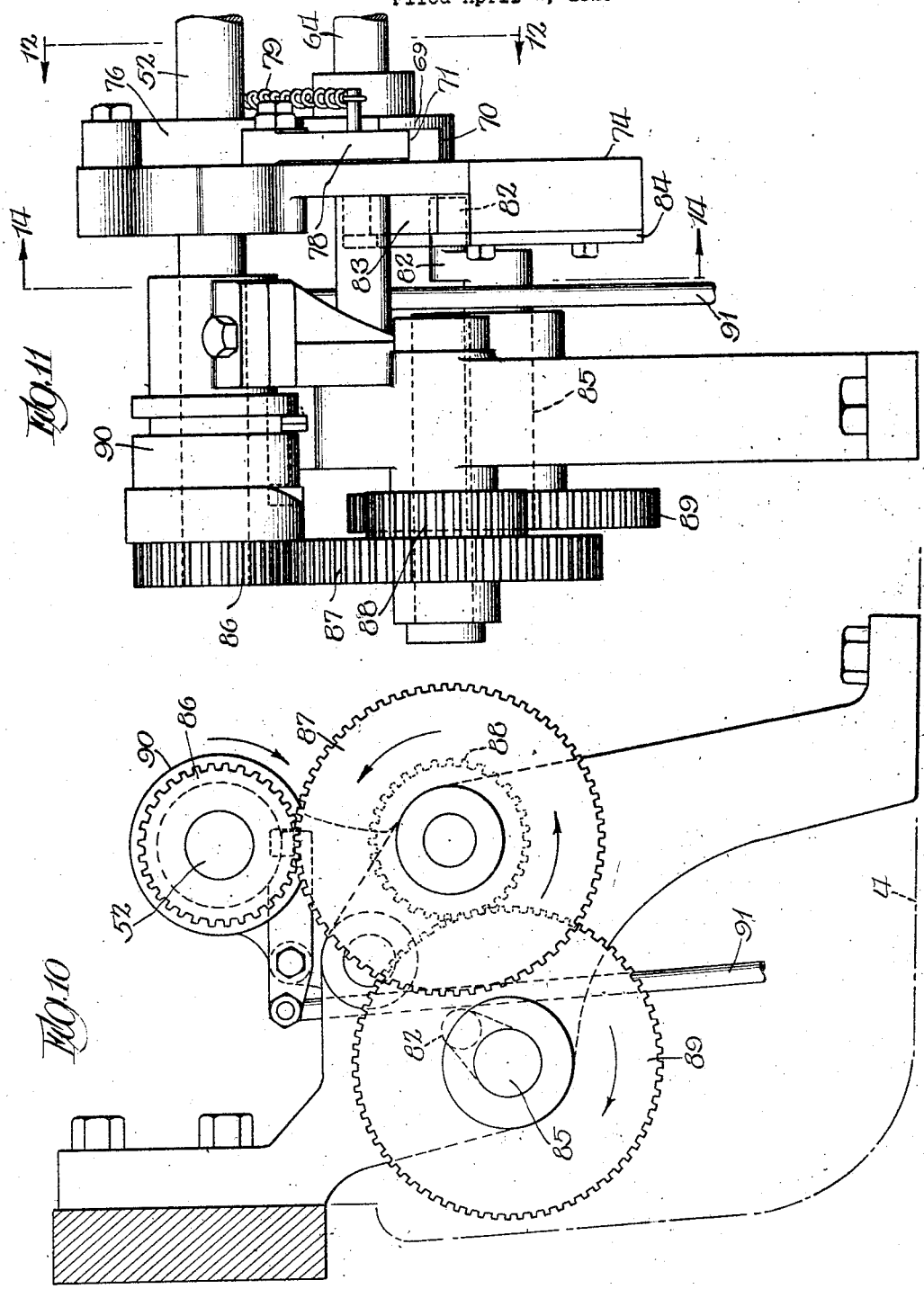

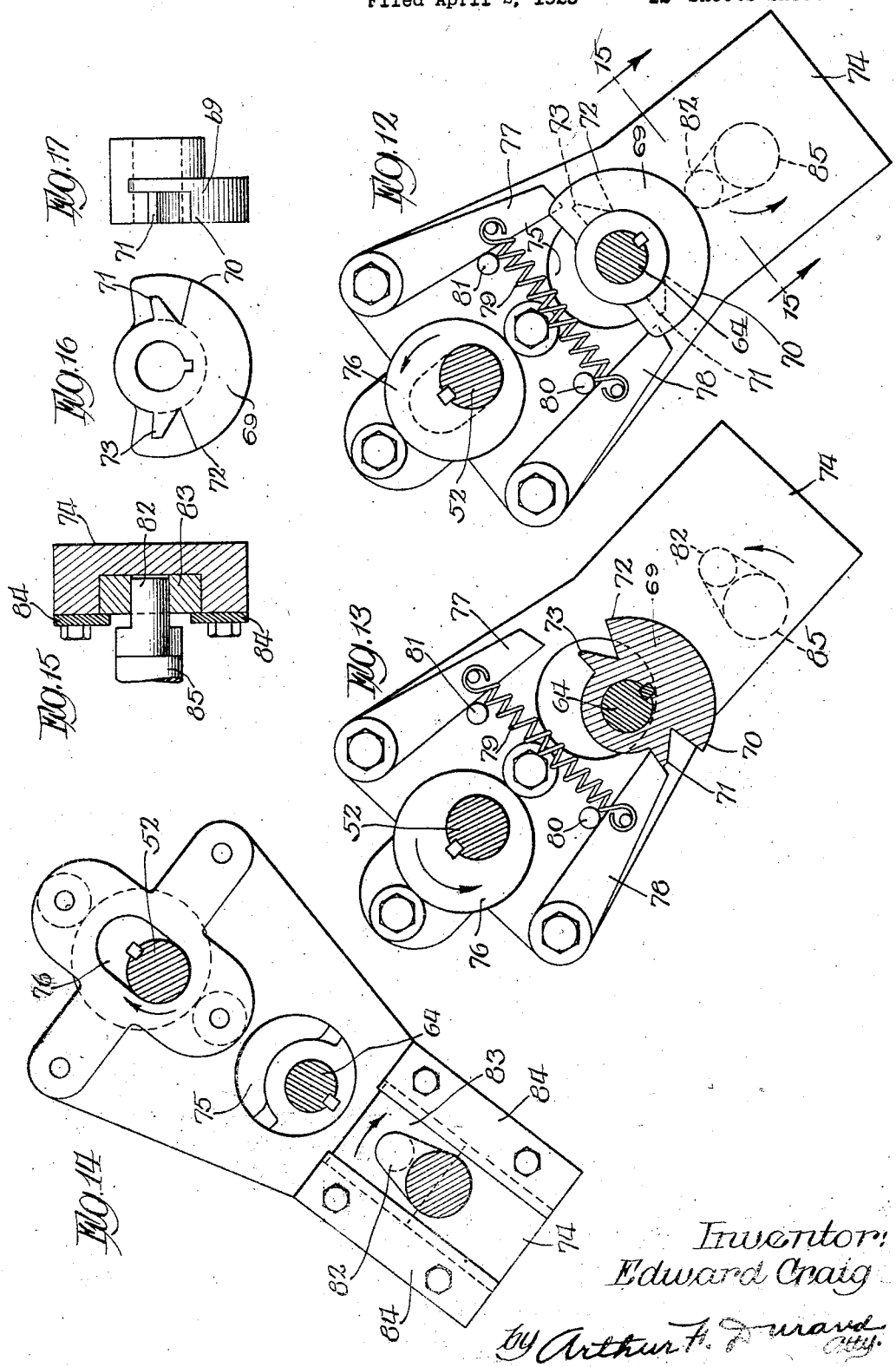

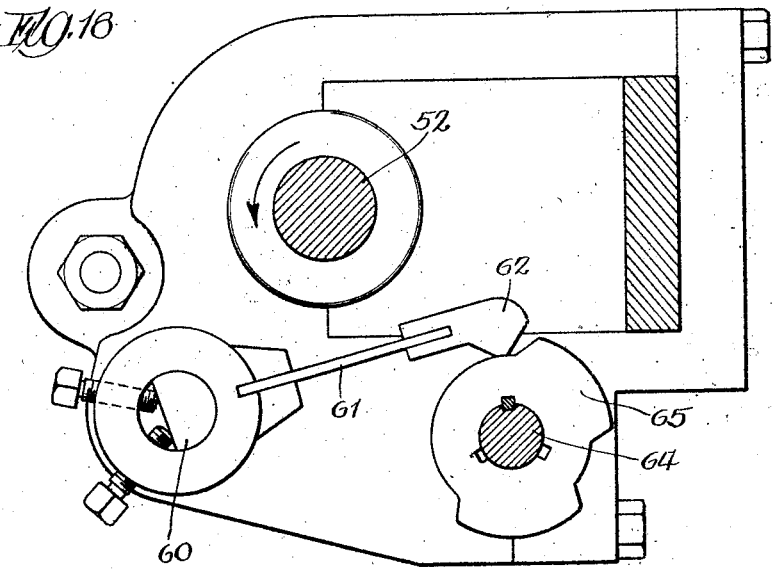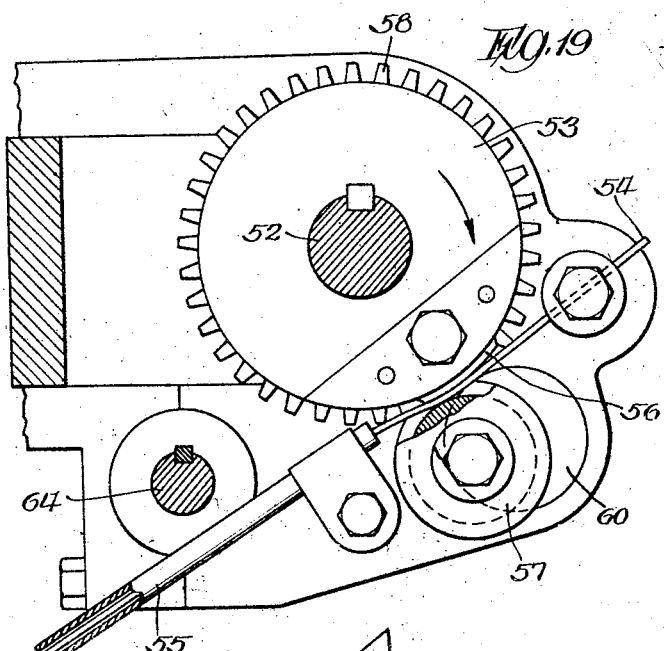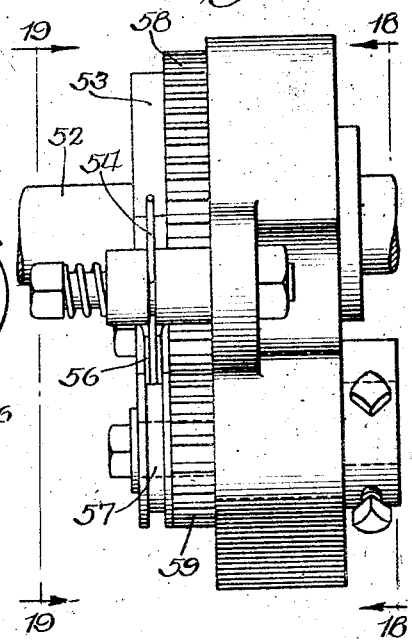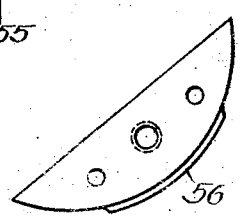

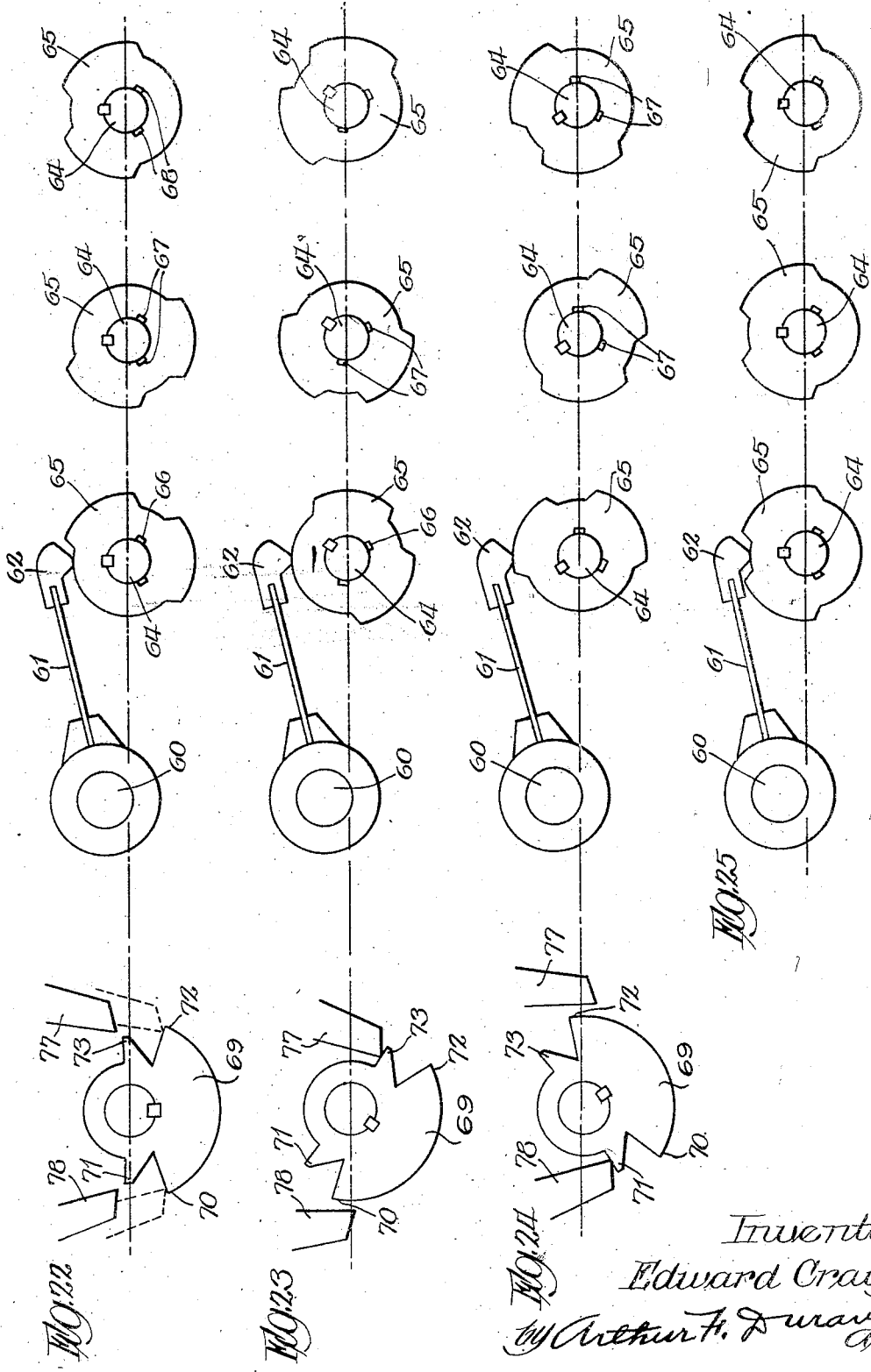

Sept. 29, 1925.　　　　　　　　　　　　　　　　　　　　　1,555,189
E. CRAIG
METHOD AND APPARATUS FOR MAKING WIREBOUND BOXES
Filed April 2, 1923　　　12 Sheets-Sheet 10
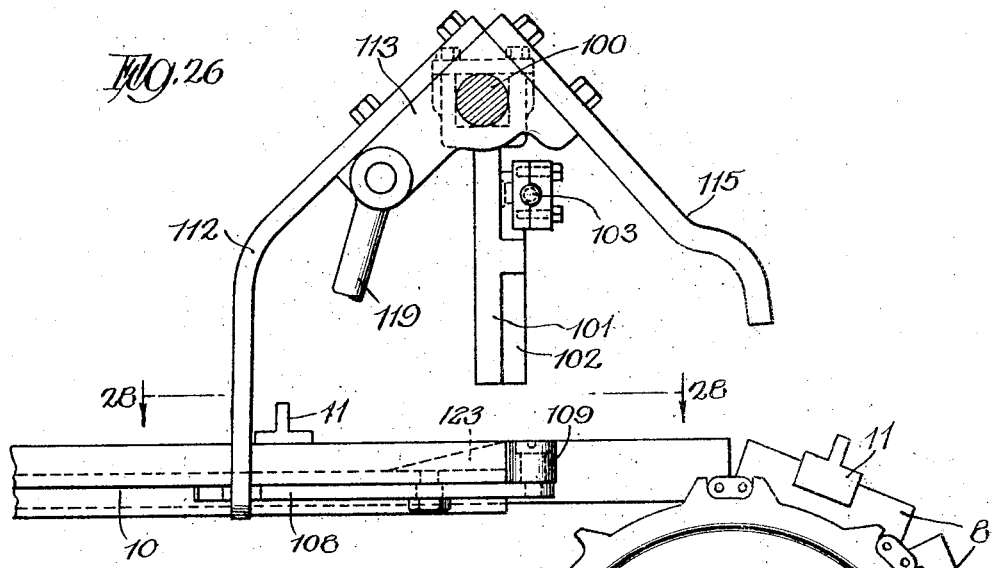
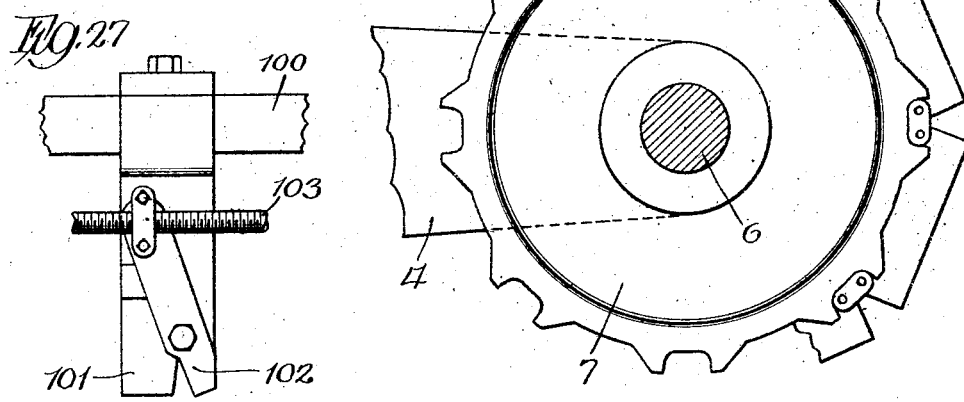
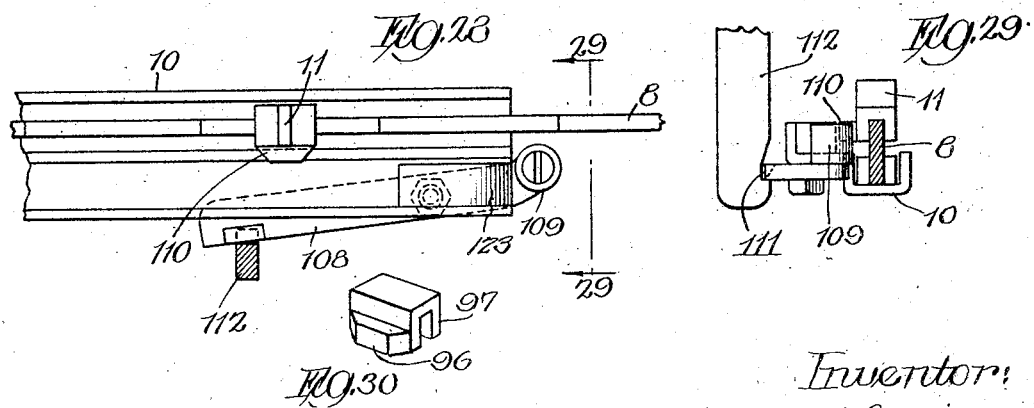
Inventor:
Edward Craig
by Arthur F. Durand
Atty.

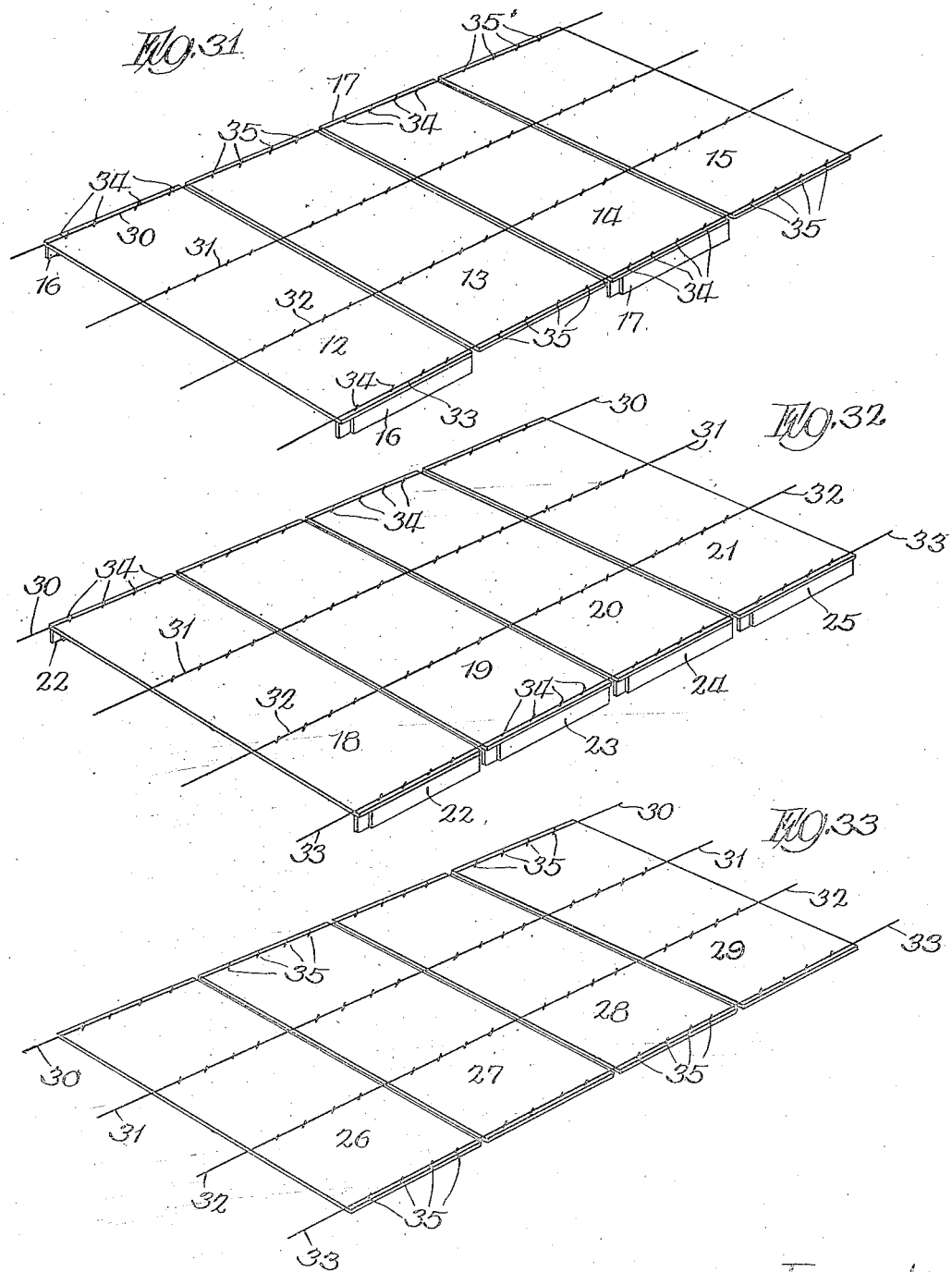

Sept. 29, 1925.  1,555,189
E. CRAIG
METHOD AND APPARATUS FOR MAKING WIREBOUND BOXES
Filed April 2, 1923   12 Sheets-Sheet 12
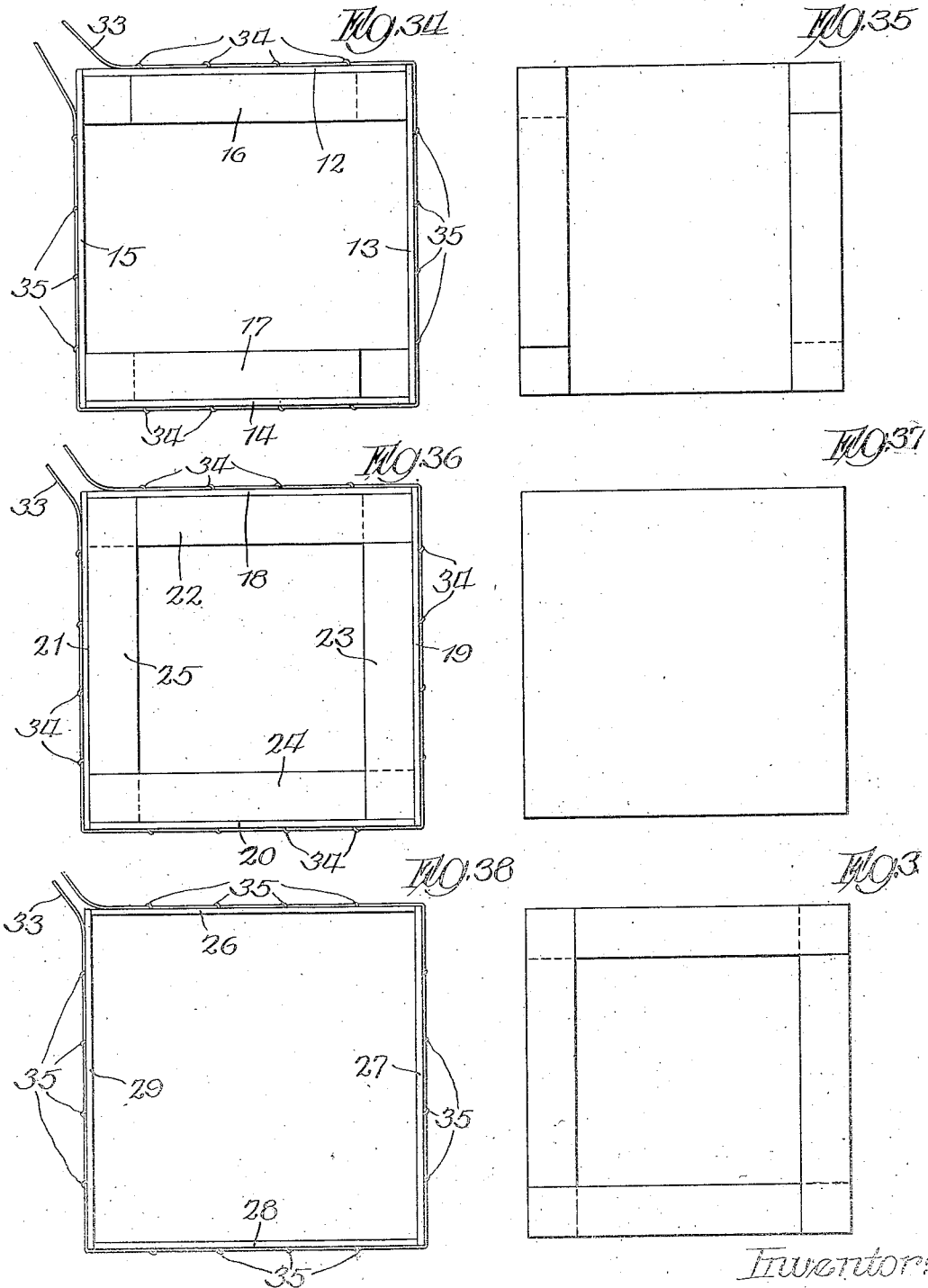
Inventor:
Edward Craig Patented Sept. 29, 1925.

1,555,189

UNITED STATES PATENT OFFICE.

EDWARD CRAIG, OF ST. JOSEPH, MICHIGAN, ASSIGNOR TO SARANAC AUTOMATIC MACHINE CORPORATION, OF BENTON HARBOR, MICHIGAN, A CORPORATION OF DELAWARE.

METHOD AND APPARATUS FOR MAKING WIREBOUND BOXES.

Application filed April 2, 1923. Serial No. 629,341.

*To all whom it may concern:*

Be it known that I, EDWARD CRAIG, a citizen of the United States, and resident of St. Joseph, Berrien County, Michigan, have invented a certain new and useful Improvement in Methods and Apparatus for Making Wirebound Boxes, of which the following is a specification.

This invention relates to the manufacture of wire bound boxes of that kind in which each wire bound box blank comprises a plurality of sections, either cleated or uncleated, bound together by parallel wires or by other metal binding, so that the ultimate boxes to be produced from these blanks will each have a top and bottom and two side walls, and either open or closed ends, depending upon the type of blank employed. A cleatless blank, of course, requires end walls in order to give it stability, for the cleatless blank is not in itself a box, and is not so recognized. On the other hand, a full cleated blank, namely one having four sections and eight cleats thereon, is in one sense a complete box in itself, inasmuch as such a blank can be used without heads or end walls, in a manner that is very common. The semi-cleatless blank, such as those having cleats only on every other section of the blank, are not susceptible of use in any satisfactory manner without the cleated heads or end walls which go with such blanks, and in this view of the case the semi-cleatless or semi-cleated blank, whichever it may be called, is not in a proper sense a box in itself. The invention relates, therefore, to the manufacture of any one or all of these different forms of box blanks.

Generally stated, the object of the invention is to provide an improved method and apparatus whereby wire bound boxes of this general class may be produced by the use of either cleatless or semi-cleatless or full-cleated blanks, in a more satisfactory and efficient manner, and whereby in the manufacture of boxes from any one of these different forms of box blanks the cleats necessary for the reinforcement of the heads or ends of the box, regardless of which form of blank is used, are all first attached to something else, either the end walls or the sections of the blank, before the binding wires are stapled to the cleats, to thereby obviate the necessity of using certain devices and methods which have heretofore been considered necessary or desirable in the manufacture of wire bound boxes of this general class, as will hereinafter more fully appear.

It is also an object to provide an improved construction and arrangement whereby a box blank machine of this general character may be employed, practically without any changes, to make either the cleatless blank or the semi-cleatless blank or the full-cleated blank, as may be desired, so that on one and the same machine the manufacturer may produce any one of these three different kinds of blanks.

It is also an object to provide a novel and improved construction of wire cutting mechanism adapted to operate without any downward movement thereof into position to cut the wires, but, to the contrary, adapted to operate by simply lifting the wires enough to bring them between the blades or jaws of the cutting devices, as will hereinafter more fully appear.

Another object is to provide an improved method and system and apparatus whereby a box blank machine of this general character may run at greater speed, with fewer operatives or attendants, so that the box blanks will be made more rapidly than is ordinarily possible with a machine requiring several attendants or operatives to not only control the machine, but to place the sheets and cleats or other materials therein, and to provide a system and apparatus whereby the wiring of the sections of the box blank together, in the making of either a cleatless or semi-cleatless or full-cleated blank, does not involve the relative positioning of cleats and sheets, such relative positioning of the cleats and sheets being accomplished either before or after the wiring operation is performed. For example, as will hereinafter more fully appear, in accordance with this invention, a full-cleated blank, one comprising four sheets of veneer and two cleats on each blank, is made by first securing the cleats to the sheets, so that the sheets and cleats are relatively positioned in the proper manner, and by then wiring the previously cleated sheets together. Also, for example, in accordance with this invention, either some or all of the cleats may be first secured to the heads or end walls of the box, so that such cleats are not relatively positioned in relation to their respective sheets until after the wiring of all the sheets together to produce the blank.

Another object is to obviate the necessity of using certain things heretofore employed or considered necessary in the manufacture of boxes and box blanks of this kind.

It is also an object to provide certain details and features of construction and novel combinations tending to increase the general efficiency and the desirability of a wire bound box blank of this particular character.

To these and other useful ends, the invention consists in the matters hereinafter set forth and claimed, and shown in the accompanying drawings, in which,—

Fig. 1 is a rear end elevation of a box blank machine embodying the principles of the invention,—that is to say, an elevation looking toward the end of the machine from which the box blanks are discharged.

Fig. 2 is a side elevation of said machine, on a smaller scale, looking toward the side at which is located the train of gears which communicate power from the overhead stapler drive shaft to the rotary shaft below which carries the feed rolls for feeding the wire from which the staples are made, it being understood that these staples are driven to secure the binding wires to the different sections of the blank.

Fig. 3 is a vertical section on line 3—3 in Fig. 2.

Fig. 4 is a plan of the hopper structure shown in Fig. 3 and in Fig. 2.

Fig. 5 is a vertical section on line 5—5 in Fig. 1.

Fig. 6 is a vertical section on line 6—6 in Fig. 1, it being understood that in both Fig. 5 and Fig. 6 the receiving end of the machine is shown broken away for convenience of illustration.

Fig. 7 is an enlarged detail plan view of certain elements of the machine, on a larger scale, showing a section of one of the endless feed belts, and showing the swinging clinch block or anvil, showing a section of one of the channel guides in which the cleats slide, and showing the pivoted controller which is engaged by cams carried on the link belt to automatically control a certain clutch hereinafter described.

Fig. 8 is a vertical transverse section on line 8—8 in Fig. 7.

Fig. 9 is a perspective of one of the sheet pushers and control cams which are carried on the link belts to push the sheets or sections of the blank.

Fig. 10 is an enlarged detail view of portions of the wire feed and automatic control devices, being in the nature of a side elevation of the parts shown in Fig. 11.

Fig. 11 is a rear elevation of the parts shown in Fig. 10.

Fig. 12 is a detail section on line 12—12 in Fig. 11, showing the parts in certain positions.

Fig. 13 is a similar view showing the parts in different positions.

Fig. 14 is a detail section on line 14—14 in Fig. 11.

Fig. 15 is a detail section on line 15—15 in Fig. 12.

Fig. 16 is a detail side elevation of the peculiarly shaped or double acting ratchet wheel shown in Figs. 12 and 13.

Fig. 17 is an edge view of the said ratchet wheel shown in Fig. 16.

Fig. 18 is an enlarged detail section on line 18—18 in Fig. 20, on a larger scale, illustrating the form of control exercised by the cam shaft over the wire feed devices which feed the staple wire to the staplers.

Fig. 19 is a section on line 19—19 in Fig. 20.

Fig. 20 is a side elevation of the mechanism shown in Figs. 18 and 19, looking to the right in Fig. 18, and looking to the left in Fig. 19.

Fig. 21 is a detail side elevation of the wire feed cam shown in Fig. 19, this being the portion of the feed wheel which engages the wire to feed the latter to the stapler.

Figs. 22, 23 and 24 are diagrammatic views illustrating different positions of the double ratchet control mechanism as shown in Figs. 12 and 13, and showing the different positions of the cams on the wire feed roll shaft which automatically control the wire feed devices to intermittently feed the wire in the desired manner, when the box blank machine is used for the making of what is called an intermittent cleat box blank, which is a blank having every other sheet provided with two cleats, and having no cleats on the other sections, this being what is called a semi-cleatless or a semi-cleated box blank.

Fig. 25 is a diagrammatic view illustrating certain control cam positions necessary when the cleatless and the full-cleated box blanks are made on the machine.

Fig. 26 is an enlarged detail side elevation of certain portions of the wire cutting mechanism shown at the left in Fig. 5, and shown at the right in Fig. 6, and showing one of the sprocket chains and a portion of one of the endless feed belts for feeding the sheets to the blank.

Fig. 27 is a rear elevation of the scissors blades and adjacent parts shown in Fig. 26.

Fig. 28 is a detail section on line 28—28 in Fig. 26.

Fig. 29 is a detail section on line 29—29 in Fig. 28.

Fig. 30 is a perspective of the cam block which is used on the belts or feed chains of the machine, if it be desired to have the cams mounted separately on the chains, instead of having the cams on the sheet pushers, as shown in Fig. 9.

Fig. 31 is a perspective of the alternate cleat blank, or semi-cleatless or semi-cleated blank, which may be made on the box blank machine shown and described, in accordance with the different objects of the invention.

Fig. 32 is a perspective of one of the full-cleated, or eight cleated blanks, which may be made on said box blank machine, in accordance with certain objects of the invention.

Fig. 33 is a perspective of one of the cleatless box blanks, or blanks which have no cleats at all, which may be made on the box blank machine shown and described, in accordance with certain objects of the invention.

Fig. 34 is an end view of the alternate cleat blank folded into box form, but without the heads or end walls thereof.

Fig. 35 is a face view of one of the heads or end walls which are necessary in combination with the alternate cleat blank to form a box.

Fig. 36 is an end view of the full-cleated blank folded into box form, showing that this form of blank is a complete box in itself without heads or end walls, as it is common to use the full-cleated blank in this manner.

Fig. 37 is a side elevation of one of the plain or uncleated heads or end walls which may be used with the full-cleated box blank, if desired, when it is desired to close the ends of the box.

Fig. 38 is an end view of the cleatless blank folded into box form, to illustrate the manner of folding, it being understood, however, that this form of blank is in no sense a box in itself, it being uncleated and having no stability whatever without heads or end walls.

Fig. 39 is a face view of the full-cleated or paneled heads or end walls which are commonly employed with cleatless blanks to produce the ultimate boxes.

As thus illustrated, the invention comprises a body frame 1 provided with base portions 2 which stand on the floor, and having forwardly extending arms 3 and rearwardly extending arms 4 to support the transverse shafts 5 and 6, respectively. Sprocket wheels 7 are mounted on said shafts to carry the endless link belts 8, which latter are of any suitable character. The body frame is provided with rigid transverse members including a bar 9, and longitudinal guides 10 are suitably mounted on the body frame. Link belts 8 are disposed inside of these guides, as shown, and are provided with sheet spacers and pushers 11 of any suitable character. Now the machine is intended for the making of a semi-cleatless or semi-cleated blank of the kind shown in Fig. 31, or for the making of the full-cleated blank shown in Fig. 32, and is also adapted to make the cleatless blank shown in Fig. 33, and the guides 10 are disposed in position to receive the cleats necessary or desired for any form of blank. If the blank is to be made as shown in Fig. 31, the four separate sections 12, 13, 14 and 15 are cut to the desired dimensions, and the cleats 16 and 17, two of each, are then made in the proper manner, with tongue and groove formation at their ends, cleats of this kind being very common. The sections 12 and 14 are then placed in a machine (not shown), and are secured to their respective cleats 16 and 17, two cleats on each sheet, by the insertion of staples or brads or nails or tacks, or anything else. The cleatless sheets 13 and 15, and the pre-cleated sheets 12 and 14, are then placed in the blank machine, with the spacers 11 between the edges of the sheets, and with the cleats 16 and 17 in the guides 10, the cleatless sections alternating with the cleated sections, as shown in Fig. 31 of the drawings. The machine is entirely dependent upon the sheets to propel the cleats, inasmuch as the work feeding and spacing means are arranged in position to prevent any portion thereof from extending into the path of the cleats, and in this way there are no cleat pushers whatever, but merely sheet spacers and pushers to engage the sheets and space them apart, whereby each sheet is individually propelled. On the other hand, if a blank of the kind shown in Fig. 32 is to be made, then the four sections of veneer or other sheet material 18, 19, 20 and 21 having pairs of cleats 22, 23, 24 and 25 are placed, with the spacers 11, between the edges of the sheets. In each case, regardless of the form of blank to be made, the binding wires 30, 31, 32 and 33, or any suitable number of wires, are secured to the top surface of the sheets to flexibly connect them together. Of course, when a blank of the kind shown in Fig. 31 is to be made, long staples 34 are driven through the sheets 12 and 14 to secure the wires 30 and 33 in place, and to secure these wires to the cleats 16 and 17, these long staples extending through the sheets into the cleats in the well known manner. The wires 30 and 33 are, however, secured to the cleatless sheets 13 and 15 by short staples 35, and these staples have their points clinched on the under surfaces of the two cleatless sheets. The staples for securing the intermediate wires 31 and 32 in place are of course short staples also, and are also clinched to the under surfaces of the two cleatless sheets. In Fig. 32, the wires 30 and 33 are everywhere secured in place by the long staples 34, as all of the sheets have cleats. In Fig. 33 all four wires, or any suitable or desired number of wires, are secured in place by the short staples 35, inasmuch as none of the sheets are provided with any cleats, and consequently only short staples are necessary in the making of this particular blank. Therefore, the two outer staplers 36 are double staplers, each one adapted to drive either long or short staples, as fully disclosed in Patent No. 1,258,989 granted March 12, 1918, while the intermediate staplers 37 are adapted to merely drive short staples, and in this way either long and short, or short staples alone, or long staples alone, are driven by the staplers 36 to secure the wires 30 and 33 in place, depending upon the character of the blank to be made. The staplers 37, however, operate always to insert short staples to secure the two wires 31 and 32 in place. These staplers are operated in the well known manner by a transverse shaft 38 through the medium of the connections 39, which latter may be of any suitable character, and this shaft 38 has an eccentric 40 which operates a reciprocating rod 41 connected at its lower end with a bell crank 42 on the side of the machine. A rod 43 having a turnbuckle 44 therein, is connected to the upper end of the arm 45, which pivots on the shaft 6 previously mentioned. This shaft has a ratchet wheel 46, and the arm 45 has a ratchet dog 47 to engage this ratchet wheel, whereby the endless work feeding chains or belts 8 are given a step by step or intermittent motion by the ratchet mechanism thus provided, when the shaft 38 is operated to actuate the staplers. Therefore, the blank materials are given a step by step feeding motion, below the staplers, and the latter insert the staples in the desired manner to form either a cleatless blank or a full-cleated blank or a semi-cleated blank or cleatless blank. For any cleatess sections of the blank, the pivoted arms 48 which are pivoted adjacent the guides 10 at 49, swing inward to present the clinch blocks or anvils 50 below the staplers which drive the short staples 35, so that these staples will be clinched on the under surface of each cleatless sheet or section of the blank. If a full-cleated blank is being made, these arms 48 are pushed out of the way by the cleats, so that they automatically stay out of the way, being subject to the tension of springs 51 which tend to pull them into the path of the cleats. If an alternate cleat blank is being made, then the clinch blocks 50 swing into position below the sections 13 and 15 of such a blank, but are pushed out of the way by the cleats 16 and 17, in a manner that will be readily understood. On the other hand, if a cleatless blank is being made, then the clinch blocks 50 remain in the position in which they are shown, in the path of the cleats, or in the guides 10, as shown, inasmuch as only short staples 35 are driven for all sections of the blank. The guides 10 support the cleats, while the staples 34 are inserted to secure the binding wires thereto, but the cleats are held against endwise displacement by the sheets to which they have been previously secured, there being no portion of the work feeding instrumentalities which extends into the path of the cleats, whereby the machine is absolutely dependent upon the sheets to propel the cleats in their guides.

Now, it will be understood, of course, that the length of the staples need not be changed, and that the same length of staple could be used for the cleatless sections, and for the cleated sections, and in that event no automatic changing from long to short, and from short to long, in the making of an alternate cleat blank, would be necessary. However, it is obvious that the cleatless sections do not require as long staples as is necessary for securing the wires to the cleated sections, inasmuch as these staples for the cleated sections cannot be clinched on their under surfaces, where they are driven into the cleats, and hence they must be longer to enable them to be firmly anchored against pulling out. Therefore as a matter of further and special improvement, the machine is preferably provided with a transverse rotary feed shaft 52 having feed rolls 53 thereon for the wires 54 which are to be fed to the tubes 55 leading to the staplers. These feed rolls have cam portions 56 which engage the wire and force the latter against the idler rolls 57, thereby to feed the wire, it being observed that the two rolls are geared together by the gear teeth 58 and 59 thereof. The rolls 57 are eccentrically mounted on the brackets 60, and these eccentric mountings are provided with tension arms 61 having engaging portions 62, and when these engaging portions 62 are raised the rolls 57 are pushed upwardly against the wires 54, so that the wire will feed forward as long as it is engaged by the cam portion 56, but will not feed forward while the rolls are rotating with the portion 56 out of engagement with the wire. The rolls rotate continuously, but thereby produce an intermittent feeding motion of the staple wires 54, so that the latter are fed forward to the desired extent necessary to produce staples of the proper length. The shaft 52 is driven by a train of gears 63 from the shaft 38 previously mentioned. Therefore, when the stapler shaft 38 is driven, the staple wire feed rolls are also driven as well as the work feeding means previously described. To automatically control the staple wire feed devices thus provided, an oscillatory shaft 64 is provided, extending parallel with the feed roll shaft 52, as shown in Figs. 18 and 19, and upon this shaft 64 are mounted the cams 65, there being one cam for each engaging portion 62 previously mentioned. These cams are all of the same shape, but they are set differently on the shaft, except those for the intermediate wires 31 and 32 which are shaped in the particular form shown and described. Therefore, for each outside stapler 36, there are two of the cams 65, and these two cams are set on the shaft as shown in Figs. 22, 23 and 24, when it is desired to make an intermittent cleat box blank. In other words, the cam for the feeding device which is to feed the wire for the long staples, of each outside stapler, is held in place by keys 66, while the cam for the feeding device which is to feed the wire for the short staples, is held in place by the keys 67, the two cams being relatively positioned, as shown, for each outside stapler, but for each of the staplers 37 there is only one cam 65, which is positioned as shown at the right in the diagrams of Figs. 22, 23 and 24, these single stapler cams being held in place by keys 68 in the manner shown. The shaft 64 oscillates back and forth, with the result that the engaging portion 62 is alternately raised and lowered by the cam, thereby alternately gripping and releasing the wire 54 between the feed rolls. Therefore, by setting the cams 65 at different angles, as shown, the different wire feed devices can be automatically controlled to feed the staple wires at the proper time, and to the desired extent, and to oscillate the shaft 64 automatically controlled mechanism is employed comprising a peculiarly shaped double ratchet wheel 69 having two teeth 70 and 71 at one side, and having two similar teeth 72 and 73 at the other side. A sliding member 74 has an opening 75 to provide clearance for the cam controlled shaft 64, and the wire feed roll shaft 52 has an eccentric device 76 by which this member 74 is reciprocated in the direction of its length. The two oppositely arranged ratchet dogs 77 and 78 are connected together by spring 79, and are normally held against stops 80 and 81, respectively. These ratchet dogs 77, 78 are for the purpose of engaging the ratchet teeth 70, 71, 72 and 73, previously mentioned, so as to oscillate the shaft 64 in the desired manner, during the operation of the machine, so that the two outside staplers will first drive long staples for a cleated section, and then short staples for the cleatless sections, in the desired manner. In order that the ratchet dogs 77, 78 may actuate the cam shaft 64 in the necessary manner, the member 74 is vibrated or swung back and forth at its lower end, by the crank 82 which engages the slide plate 83, the latter sliding in longitudinal guides 84 on the said member 74 previously mentioned. Thus, while the eccentric device 76 is reciprocating the member 74, the crank 82 is vibrating this member, thereby causing the dogs 77, 78 to take turns at actuating the double ratchet wheel 69, in the manner necessary to cause the cams 65 to properly control their respective tension arms 61, when it is desired to make an intermittent cleat blank, as is assumed for the purpose of the present illustration of the mode of operation of the machine. The crank 82 is on a shaft 85, which is operated from the wire feed shaft 52 through the medium of the gears 86, 87, 88 and 89, the latter being on the said shaft 85, and a clutch 90, of any suitable character, being interposed between the shaft 52 and the pinion gear 86 previously mentioned. This clutch is normally open, but each time it is closed, as will hereinafter more fully appear, the shaft 85 is given a one quarter turn or rotation. This clutch is controlled by a rod 91 which is connected to a bell crank 92 pivoted at one side of the machine. A rod 93 connects the upper end of this bell crank with a horizontally pivoted lever 94, which latter has a roller 95 disposed in position to be engaged by the cams 96 carried by some of the spacers 11 previously mentioned. Thus, whenever a cam 96 strikes the roller 95, the clutch 90 is closed, and the crank 82 will shift the slide 83 and move the member 74 in the desired manner, thus altering or changing the control of the ratchet dogs 77, 78 over the ratchet wheel 69 previously mentioned, and causing a partial rotation of the shaft 64 to the extent necessary to stop the feeding of the wire to the staplers which drive the long staples, or vice versa, and to start the operation of the feeding devices which feed the wire to the staplers which drive the short staples, or vice versa, thus enabling the feeding motion of the endless work feeding chains to automatically control the action of the staplers, thereby to drive long staples in the cleated sections and short staples in the cleatless sections, in the manner described.

The tension arms 61 for the wire feed devices of the staplers 37 work up and down in unison, as their cams 65 are set exactly the same on the shaft 64; but each stapler 36 has, as previously stated, allotted to it two of the cams 65, one to control the feed rolls 53 and 57 which feed the wire for the long staples, and the other to control the feed rolls 53 and 57 which feed the wire for the short staples. With the automatic control mechanism shown and described, therefore, by arranging the cams 96 in suitable positions on the feed chain, no staples will be driven between blanks, as all of the staplers will be thrown out of action for this purpose; and, in order to prevent the driving of staples between the sections of the same blank, the engaging portions 62 of all the wire feeding devices will fall into neutral positions while the spaces between the sheets of the same blank are passing under the staplers. The cams 96 can be located on the spacers 11 to some extent, or all together, or some of these cams 96 may be located on the blocks 97 which have no propelling or spacing function on the link belt which controls the pivoted lever 94 in the manner described. In other words, these cams 96 can be located wherever necessary on the link belt to exercise the desired automatic control over the action of the staplers. The making of an intermittent cleat blank, as explained, is accompanied by oscillation of the cam shaft 64 to raise and lower the engaging portion 62, in the manner required by each stapler, thereby to alternate from long to short staples, and vice versa, during the stapling of the wires to the four sheets of the blank. Fig. 22 shows all of the cams in neutral position, so that the wires 54 are loose everywhere and will not be fed forward by the rotation of the feed rolls. Approximately, the crank shaft 85 may rotate twice, or make two complete revolutions, for each blank being made. Also, the wire feed shaft 52, when four staples are driven in each section of the blank, as shown, may rotate approximately nineteen times for each blank, and for each rotation a staple will be driven, except that every fifth rotation represents a miss or non-driving action of the staplers, in order to prevent the driving of staples between the edges of the sheets or sections of the blank. Between blanks the wire feed shaft 52 will rotate several times, and each time will be a miss or a non-driving stroke of the staplers; the number of times will depend upon the space between the blanks, in order to insure wire ends of suitable length for twisting together at opposite ends of the blank, in the ultimate conversion of the blanks into boxes. In other words, in changing from one length of staple to the other, in making an intermittent cleat box blank, such as shown in Fig. 31, the cams 65 all reach neutral positions so that no wire whatever is fed for the making of any staples, and this prevents the driving of staples in the spaces between the sheets of the same blank. Also, when the end of the blank is reached, and before the front end of the next blank comes under the staplers, the cams 65 all remain in neutral position to permit the wire feed rolls to rotate several times without feeding any staple wire, thus absolutely preventing the driving of any staples between blanks.

It is also desirable, of course, to make blanks of the kind shown in Fig. 32, called the full or eight cleated blanks, and also blanks of the kind shown in Fig. 33, which latter are ordinarily called cleatless blanks. Fig. 25 is a diagrammatic view showing the arrangement of the cams on the shaft 64 when blanks of this kind are used, it being obvious that for either blank there is no changing from one length of staple to the other. If the full-cleated blanks are made, as shown in Fig. 32, then all long staples are driven; but if cleatless blanks of the kind shown in Fig. 33 are made, then all short staples are driven. It follows, therefore, that for the making of the blank shown in Fig. 32, the cams 65 for the wire feed devices which feed the wire for the short staples are taken off, leaving on the shaft 64 only the cams for feeding the wire from which are made the long staples driven by the outside staplers 36, and the cams 65 for the staplers 37, all the remaining cams being set exactly alike, inasmuch as the control must be the same for each stapler in use at such time. On the other hand, when a blank of the kind shown in Fig. 33 is employed, then the cams 65 which control the feed rolls which feed the wire for the long staples, in the staplers 36, are taken off, and only the cams allotted to the staplers 36 which control the feeding of the wire for the short staples are left on the shaft 64, and in such case the cams 65 allotted to the staplers 37 remain on the shaft; and at such a time the cams on the shaft 64 all have the same position. Thus for the making of a full-cleated blank, such as shown in Fig. 32, the staplers 36 drive long staples all the time, in all the sections of the blank, while the staplers 37 drive only short staples, as they always do for any form of blank; and when a cleatless blank of the kind shown in Fig. 33 is being made, the staplers 36 drive only short staples, and the staplers 37 drive short staples, clinch blocks 98, or any suitable means, being provided to clinch the staples which are driven by the staplers 37 to secure the wires 31 and 32 in place on any of the blanks. It will be understood, of course, that the binding wires are supplied in any suitable or desired manner, as by feeding them from reels 99 suitably arranged over the machine, under the staplers, by any of the well known devices for this purpose, staplers which are constructed to attach binding wires being very old and very common in this art. Thus the binding wires exert a drag or back pull on the blanks, and this back pull of the wires is communicated successively to the different sections of the blank, inasmuch as each section of the blank is propelled individually and by its own propelling means, and no section of the blank is propelled by the section behind it, the propelling power being communicated individually to each and every section of the blank. The clutch 90, of course, can be of any suitable character, and does not need description, as any clutch control which can be operated by the rod 91 will serve the purpose for controlling the transmission of power from the shaft 52 to the gearing which operates the crank shaft 85 previously described.

Now it is also desirable to automatically sever the binding wires, between blanks, as they are discharged from the machine, and for this purpose the machine is provided with a transverse support 100 upon which are rigidly mounted the downwardly extending ledger blades 101 of each cutting device, there being as many devices as there are binding wires. The pivoted or movable blades 102 are connected together by a transverse and endwise movable rod 103, and this rod is operated by a crank arm 104 which at certain times engages the end of the rod to simultaneously actuate all of the cutting devices. This crank arm 104 is mounted at the upper end of a vertically movable shaft 105, to the lower end of which is secured another crank arm 106 which is engaged at the proper time by an adjustable screw head 107 on the upper end of the rod 43 previously described. The portion 104 is too low to strike the end of the rod 103, each time the rod 43 is pulled backward, so that the cutting devices are not actuated while the four sections of a blank are traveling under the staplers. A horizontal lever 108 is pivoted as shown, and is provided with a roller 109 to be engaged by cams 110 on one of the feed chains. This lever 108 normally engages the notch 111 in the lower end portion of the arm 112 which is mounted on the bracket 113, which latter is mounted to oscillate on the shaft support 100 previously mentioned. A spring 114 connects the arm 112 with the body frame, in any suitable manner, and another arm 115 is secured to the bracket 113 in position to be engaged by the rollers 116 and 117 carried by the upper end portion of the rod 43 previously described. Now when the cam 110 strikes the roller 109, the lever 108 releases the arm 112, thereby permitting the spring 114 to pull the arm 112 backward. A pivoted lifter 118 is connected by a link 119 with the bracket 113, and this lifter engages and raises the arm 106 and the shaft 105 just enough to permit the arm 104 to assume a position directly opposite the end of the rod 103, so that upon the back stroke of the rod 43 the screw 107 will strike the arm 106 and cause the arm 104 to move the rod 103 endwise, to the right in Fig. 1, thereby to actuate all of the cutting knives 102, in a manner that will be readily understood. The shaft 120 upon which the lever 118 is mounted is provided inside the body frame with three other similar lifters 121 adapted to engage the under side of the blanks. Consequently, when the arm 112 is pulled backward by the spring 114, the lifters 121 raise the blank, and the operation is so timed that the wires between the ends of two blanks are raised into position between the knives 101 and 102, of each cutting device, and at the same time the rod 103 is actuated as stated to operate the cutting devices to cut the wires. Immediately thereafter, upon the back stroke of the rod 43, the roller 117 strikes the arm 115, the lower end of this arm having been inserted between the two rollers 116 and 117 by the action of the spring 114, and this will restore the arm 112 and the lifters 118 and 121 to normal position, and will cause the lever 108 to again lock the arm 108 in normal position. Spring means of any suitable character (not shown) can be employed to yieldingly control the lever 122 in the desired manner, so that it will act as a spring control latch to lock the arm 112 in normal position. Similarly, spring means of any suitable character (not shown) can be employed to yieldingly maintain the elements 104, 105 and 106 in normal position, and to restore them to normal position after actuation in the manner explained. Only slight upward movement of the arm 104 is necessary, and comparatively slight swinging movement of this arm is necessary to actuate the cutting devices, in the manner explained. Therefore, the cutting devices are in fixed position, and are not lowered into the spaces between the blanks, but, to the contrary, the binding wires are elevated or lifted into position to engage such cutting devices at the proper time, thereby to sever the wires between blanks, and the wire cutting instrumentalities thus provided are then restored to normal condition to lower the blanks and permit them to be discharged from this end of the machine.

Now, with the foregoing method and apparatus, the feeding of materials from a hopper is rendered more practicable and certain than heretofore, to this extent. When sheets of veneer without any cleats are superposed in a hopper, and fed from the bottom of the stack, there is liable to be some difficulty because of warping of the sheets, and for other reasons, the sheets some times being rather thin. However, with the sheets precleated or reinforced by cleats secured thereto, in the manner explained, such sheets can be fed very readily from a hopper 122, arranged over the receiving end portion of the work-feeding and guiding means, with the cleats downward. These cleated sheets will be forced from the bottom of the hopper, one at a time, by the flights or pusher lugs on the endless chains or feed belts, so that the sheets will be fed automatically in their proper relative positions on the work-conveying means. Of course, uncleated sheets can be fed and this automatic feeding scheme will work all right if the sheets are flat and substantially uniform in thickness. Precleating the sheets, however, keeps them flat and makes them easier to feed from the hopper.

In any event, however, as explained, the problem of relatively positioning the cleats relative to their respective sheets is solved outside of the blank-making operation, or wiring operation, as such relative positioning is accomplished either before or after wiring the sections together. For a full cleated blank the relative positioning of the cleats and sheets is all accomplished by the precleating of the sheets previous to the operation of wiring the sheets together. In the making of a semi-cleatless or alternate cleat blank such sheets as are cleated in the blank are supplied with their cleats before the operation of wiring the sheets together, so that the relative positioning of these cleats with respect to their allotted sheets is accomplished before the wiring operation is performed; but for the uncleated sheets of a semi-cleated blank the relative positioning of the cleats with respect to their allotted sheets, is accomplished after the wiring of all the sheets together, and in the conversion of the blank into the ultimate box. On the other hand, in the making of boxes from cleatless blanks, the sections of the blank are all wired together before the cleats are properly related to their respective sheets, as the cleats have all been previously secured to the heads or end walls, and under such circumstances the cleats are all relatively positioned in proper relation to their respective sheets after the wiring of the sheets together, and during the conversion of the cleatless blank into the ultimate box.

The method or process, it will be seen, is designed more particularly for use in the making of wire bound box blanks by machinery, inasmuch as the cleating of the sheets, or some of them, before they enter the machine, obviates the necessity of employing any cleat propelling or positioning means for the cleats thus previously secured to any sheet. In other words, one of the objects of the cleating of the sheets, or some of them, before they enter the machine, is to obviate the necessity of using cleat pushers or cleat spacers in the operation of the blank making machine, or to minimize or reduce the use of cleat pushers or cleat spacers in such machine. It is also an object to speed up the operation of the machine, by obviating the necessity of employing attendants to place the cleats and sheets separately in the machine, for it is much easier for the attendants to place the cleated sheets in the machine, very obviously, than it is to place separate cleats in the machine and then place sheets in proper position thereon. By previously cleating the sheets, before they enter the machine, the sheets themselves become the means for feeding the cleats before the binding wires are attached thereto, and the sheets become the vehicle or medium by which the cleats are carried automatically into proper position in the machine. In other words, by placing a cleated sheet in the machine, the cleats automatically, so to speak, are carried into position, and are made to assume their proper positions without special effort or attention for that purpose, as the placing of the sheet in the machine automatically positions the cleats.

It will be seen that the feature of individually propelling the sheets, so that the sheets propel any cleats which are employed for the blank, contemplates a machine for stapling wires to previously cleated sheets, or to cleatless sheets, depending upon what sort of blank is desired, and likewise contemplates a method for attaching wires to previously cleated sheets, while the sheets are being held in spaced relation, in a method in which the apparatus employed is operative to individually propel the sheets. Thus the work feeding means of the machine call for previously cleated sheets, if cleated blanks are to be made, as the machine has no means for feeding or propelling cleats, and the method or process involved in the manufacture of box blanks by machinery in this manner contemplates the attaching of wires to previously cleated sheets held in spaced relation and individually propelled in such relation to receive the binding wires and the staples by which the wires are attached to the sheets.

As shown in Figs. 26 and 28, the roller 109 would be in the way of any cleats sliding in the guides 10, but by employing wedge-shaped blocks 123 in the ends of the guides, with their inclined surfaces upward and sloping toward the oncoming cleats, it is obvious that the cleats will be elevated sufficiently to ride over the roller 109 without interference.

Thus the spacing apart of sheets serves automatically to relatively position some cleats, preferably at least four cleats for each blank, but it is obvious that any suitable number of cleats can thus be automatically positioned in the blank, preliminary to the wiring thereof, by the spacing apart of the sheets.

The machine has sheet spacers 11 for spacing the sheets, and these sheet spacers function to relatively position the cleats of one or more sections of each blank. Thus there are sheet spacers which not only have the function of spacing the sheets apart, and of feeding the sheets or sections of the blank individually, so that the back pull of the binding wires cannot be communicated from one sheet or section to another, but which also have the additional function of positioning some of the cleats of each blank. These spacers 11 individually feed the sheets or sections and thus the cleats of any precleated section or sections of the blank are dependent for their feeding motion and their proper positioning in the blank upon the sheet spacers or sheet feeders which engage the rear edges of the sheets or sections of the blank. In this way the said elements 11, or some of them, each have three functions. First the individual feeding of the sheets, second spacing the sheets apart, and third the positioning and feeding of some of the cleats of each blank, when a cleated or a semi-cleated blank is made. In this way, the necessity of using any cleat spacers, or even cleat pushers, is obviated and avoided by these methods, and in a machine of this kind either a cleated or semi-cleated or a cleatless blank may be made when desired and on one and the same machine and without changing the construction of the machine.

What I claim as my invention is:

1. A method for making wire bound box blanks by machinery, comprising the feeding of sheets and cleats along in a machine for fastening binding wires to the sheets, so that the cleats, or some of them, are carried by the sheet material, inserting staples through sheets and into cleats, to secure the wires to sheets and cleats by said staples, and to flexibly connect the different sections of the blank together, while maintaining the edges of the sheets in spaced relation during the forward feeding motion in said machine, thereby automatically positioning two or more cleats of each blank by the spacing apart of the sheets, so that the wiring of the sheets together in spaced relation is accomplished entirely after some cleats have been previously secured to sheet material, and whereby the wiring of the sheets together with their edges spaced apart is accomplished in a manner to obviate the necessity of providing said machine with means for positioning the cleats, or some of them, and propelling each sheet individually in a manner to prevent compression of the sheets together in the plane thereof, so that the predetermined spacing of the sheets and the resulting predetermined relation thereto of the cleats of one or more sheets is maintained during the wiring operation, whereby at least some cleats have the binding wires stapled thereto while held in position by the sheet or sheets to which they were attached before the operation of wiring the spaced sheets together.

2. The method as specified in claim 1, the cleats being previously attached to each and every section of the blank, whereby in the wiring operation the cleats are held end to end by their respective spaced sheets, and so that the spacing of the sheets serves automatically to position all of the cleats of the blank.

3. The method as specified in claim 1, at least two sheets of each blank having cleats rigid therewith before the wires are secured thereto, so that the spacing of the sheets apart serves to distance at least two cleats apart at each side edge of the blank.

4. The method as specified in claim 1, at least four sheets of each blank having cleats rigid therewith before the wires are secured thereto, so that the spacing of the sheets apart serves to distance at least four cleats apart at each side edge of the blank.

5. A machine for making wire bound box blanks by securing wires to previously cleated sheets, whereby each blank will have separate sheets bound together by parallel binding wires, with reinforcing cleats for one or more sheets, comprising instrumentalities for feeding the sheets forward and spacing them apart at their edges, with the desired number of cleats on one or more of the sheets, by engaging the rear edges of the sheets only, and with said instrumentalities disposed in position to prevent any portion thereof from projecting into the path of the cleats, so that the machine is dependent upon the sheets to propel the cleats forward, and whereby said instrumentalities have both spacing and propelling engagement with each and every sheet, means for supplying binding wires to the surface of the sheets, and staplers for inserting staples to secure said wires to the sheets to flexibly connect them together in spaced relation.

6. A structure as specified in claim 5, said instrumentalities comprising endless feed belts having lugs thereon for insertion between the sheets, so that each lug must function not only as a combined sheet pusher and spacer, but also as a binding wire puller, as well as indirectly through the sheets to propel any cleats desired for the blank.

7. A machine for making wire bound box blanks by wiring either cleatless or precleated sheets together, to form a flexible blank, comprising work feeding and guiding means adapted to receive cleats and sheets for either a semi-cleated or a full-cleated blank, said feeding means requiring the precleating of one or more sheets of each blank, and adapted also to receive sheets for a blank without any cleats, said work feeding means being adapted to space and hold the sheets in spaced relation, so that the sheet spacing means serve also to relatively position and propel two or more cleats of each blank, means for supplying binding wires to the surface of the sheets, staplers for inserting staples to secure the wires to the sheets and cleats, means to clinch the staples on the under side of any sheets which have no cleats, adapted to move out of the path of any cleats desired for the blanks, feed mechanism to feed wire to said staplers to form the staples, and devices governed by the forward feeding motion of the blank materials to automatically control said means for feeding the wire to the staplers, thereby to automatically govern the action of the staplers in accordance with the cleated or cleatless character of the blanks to be made, said work feeding means being disposed in position to prevent any portion thereof from extending into the path of the cleats which travel in said guiding means.

8. A machine for making wire bound box blanks by wiring either cleatless or precleated sheets together, to form a flexible blank, comprising work feeding and guiding means adapted to receive cleats and sheets for either a semi-cleated or a full-cleated blank, said feeding means requiring the precleating of one or more sheets of each blank, and adapted also to receive sheets for a blank without any cleats, said work feeding means being adapted to space and hold the sheets in spaced relation, so that the sheet spacing means serve also to relatively position and propel two or more cleats of each blank, means for supplying binding wires to the surface of the sheets, staplers for inserting staples to secure the wires to the sheets and cleats, means to clinch the staples on the under side of any sheets which have no cleats, adapted to move out of the path of any cleats desired for the blanks, feed mechanism to feed wire to said staplers to form the staples, and devices governed by the forward feeding motion of the blank materials to automatically control said means for feeding the wire to the staplers, thereby to automatically govern the action of the staplers in accordance with the cleated or cleatless character of the blanks to be made, said work guiding means comprising parallel guides for the cleats, and said work feeding means comprising parallel endless link belts having sheet pushers and spacers thereon arranged entirely between the two guides, thereby to prevent any portion of the work feeding or propelling means from extending into the path of the cleats.

9. A box blank machine for stapling sheets to cleats, wire feed mechanism for feeding wire for relatively long staples for cleated sheets, mechanism for feeding wire for relatively short staples for cleatless sheets, work feeding means, a controller actuated by the forward feeding motion of said work feeding means, a clutch controlled by said controller, a shaft having means thereon to control the action of said wire feeding means, and means controlled by said clutch to control the action of said shaft, thereby to determine whether long or short staples shall be driven in said sheets.

10. A structure as specified in claim 9, said work feeding means comprising an endless feed belt having blocks thereon to position the sheets, and means on said blocks to engage the controller, in combination with means for supplying binding wires in position to be fastened to the work by the long staples or by the short staples or by both.

11. A structure as specified in claim 9, said work feeding means comprising an endless feed belt having means for spacing the sheets, and having means to engage said controller, in combination with a movable clinch block for movement into position to clinch the short staples, and adapted to move back out of the way of any materials into which the long staples are driven.

12. In a box blank machine for stapling wires to sheets, and for wiring the different sections of the blank together, the combination of a stationary cutting device to cut the binding wire between blanks, automatic means for lifting the wire into operative engagement with said cutting device, and means for automatically operating said device to cut the wire.

13. A structure as specified in claim 12, in combination with means for feeding the blank materials in a plane below the operative position of said cutting device, and means whereby the action of said cutting device, when the wire is lifted thereto is controlled by the actuation of said work feeding means.

14. A structure as spcified in claim 12, in combination with work feeding means for feeding the blank materials, and means whereby said means for lifting the wire are automatically controlled by the actuation of the work feeding means.

15. A structure as specified in claim 12, in combination with means including a ratchet mechanism for feeding the blank materials forward, and means whereby said cutting device and said lifting means are automatically controlled by the action of said ratchet mechanism.

16. A structure as specified in claim 12, in combination with means for locking said lifting means in normal position, work feeding means having provisions for tripping said locking means, means for automatically operating said lifting means when unlocked by the feeding motion of the work feeding means, and means for automatically locking the lifting means in normal position after the cutting of the wire.

17. The improved method of stapling wires to previously cleated sheets, for making box blanks by machinery, each blank having sheets and cleats and parallel binding wires, comprising the feeding of all of the sheets and cleats along in a stapling machine, with the sheets in spaced relation and under individual feeding pressure, and with one or more sheets previously cleated, so that the spaced sheets perform the function of relatively positioning some cleats, previous to the fastening of wires to the sheets, thereby obviating the necessity of providing said machine with means for positioning or feeding the cleats, or some of the cleats, and stapling the wires to the sheets and cleats.

18. Apparatus for making box blanks having cleats and sheets and parallel binding wires, comprising work-feeding instrumentalities for individually feeding and propelling the different sections of the blank, means for supporting said instrumentalities in position to prevent any portion thereof from extending into the path of cleats, so that the apparatus is dependent upon the individually propelled sheets to propel the cleats attached thereto and means for securing binding wires to the individually propelled sheets, by the insertion of staples through the sheets and into the cleats.

19. A method for making wire bound box blanks by machinery, comprising the spacing of the sheets apart and feeding them in spaced relation in a stapling machine, so that each sheet is propelled by forward feeding motion communicated directly thereto by the feeding means of said machine, with cleats carried by one or more of the sheets of each blank, and stapling binding wires to the sheets and cleats by the operation of said machine, thereby wiring the sheets together while held in spaced relation by the feeding means of said machine, thereby automatically positioning at least two cleats in each blank by the spacing apart of the sheets, and whereby the cleats, or some of them, are moved forward by one or more sheets before the wires are stapled thereto, thus obviating the necessity of using in said machine any feeding or positioning means for engaging the cleats which are carried by their sheets.

20. A method as specified in claim 19, in which each and every sheet of the blank is equipped with cleats secured thereto, so that all of the cleats of the blank enter the machine with their respective sheets, and whereby said machine is equipped with sheet positioning and spacing and feeding means only, and no portion of said feeding means is required to project into the path of the cleats, inasmuch as all of the cleats of the blank are carried and propelled by their respective sheets before the wires are stapled thereto.

21. A method as specified in claim 19, in which all of the cleats of the blank are rigid with their respective sheets, before the wires are secured thereto in said machine, whereby no portion of the feeding and positioning means of said machine is required to project into the path of the cleats, and whereby all of the cleats of the blanks are carried by and propelled by their respective sheets before the binding wires are stapled thereto.

22. The method herein described of making wire bound box blanks of that type embodying a plurality of sheets flexibly bound together by wires, one or more of the sheets being provided with cleats, consisting in power-feeding the sheets in succession, in spaced relation, with cleats previously attached to one or more sheets of each blank, laying the wires continuously on the sheets as they are fed and stapling them thereto, whereby some cleats are attached to one or more of the spaced sheets before the wires are attached thereto, the staples entering the cleats, the propelling force being applied separately to the back edge of each sheet, whereby the crowding or jamming of the sheets together is prevented and the cleats, or some of them, are carried forward through the medium of the sheets which carry them, and obviating the use of feeding or positioning means for any cleats which are rigid with one or more sheets before the wires are stapled thereto.

23. The method specified in claim 22, the propelling means applied to the rear edges of the sheets serving also to space the sheets.

24. The process of making a wire bound box blank consisting in assembling a sufficient number of precleated sheets to form the box blank, spacing the sheets by suitable means, individually propelling the sheets whereby compression of the sheets in the plane thereof is prevented, and wiring said sheets together as they are so propelled.

25. The method of making a wire bound box blank, comprising the successive wiring together of successive sheets, with cleats previously attached to one or more sheets, while maintaining a pull on the wires, keeping the sheets in spaced relation, preventing the pull of the wires from exerting any thrust through one sheet to another, whereby the spacing and individual positioning of the sheets prevents the pull of the wires from being communicated from one sheet to another and serves automatically to relatively position some cleats of the blank.

26. A machine for making wire bound box blanks by wiring sheets and cleats together, comprising work positioning means requiring the precleating of one or more of the sheets of each blank, and adapted for individually holding the sheets and spacing them apart, together with instrumentalities to staple the binding wires to the spaced sheets of each blank, and to cleats thereof, said holding means preventing the pull of said wires from being communicated from one sheet to another.

27. The method of making a wire bound box blank, comprising the spacing of the sheets or sections of the blank apart, by interposing spacers between said sections, with cleats previously attached to one or more sections, thereby using the sheet spacers to relatively position the cleats of one or more sections of each blank, thus obviating the use of spacers between the cleats, communicating power through said spacers to feed the sheets forward in unison and thereby cause one or more sheets of each blank to feed any previously attached cleats thereof, so that such spacers have the triple function of spacing the sheets, feeding the sheets, and feeding and positioning the cleats of one or more sections of each blank, and wiring the sections of the blank together as they are fed by the sheet spacers.

EDWARD CRAIG.